June 23, 1942.    B. H. ANDERSON    2,287,506
MILKING MACHINE
Filed Dec. 10, 1938    4 Sheets-Sheet 1

Benjamin H. Anderson
INVENTOR
BY George F. Mueller
ATTORNEY

INVENTOR.
Benjamin H. Anderson
BY
ATTORNEY.

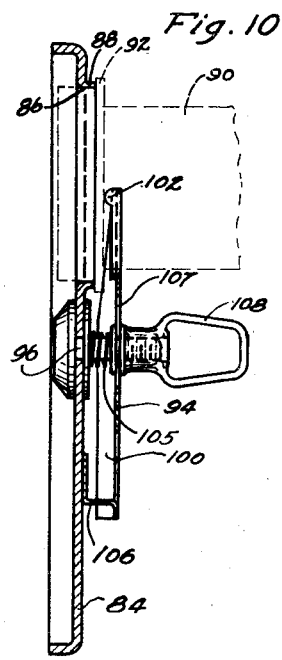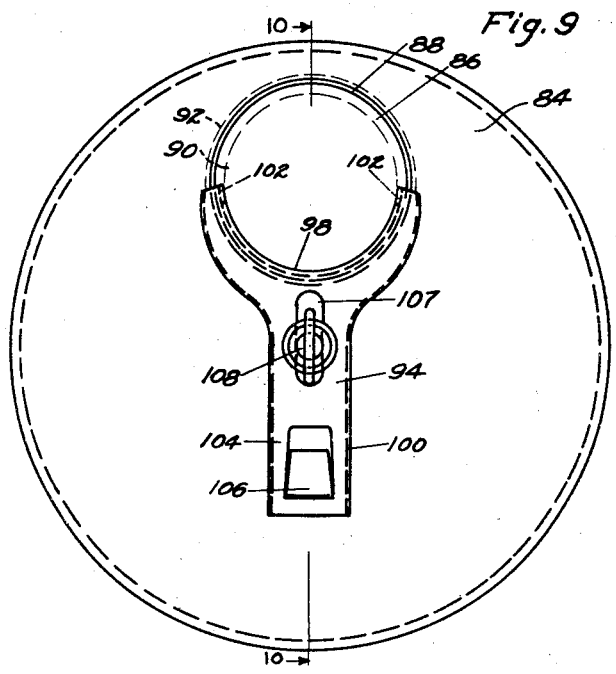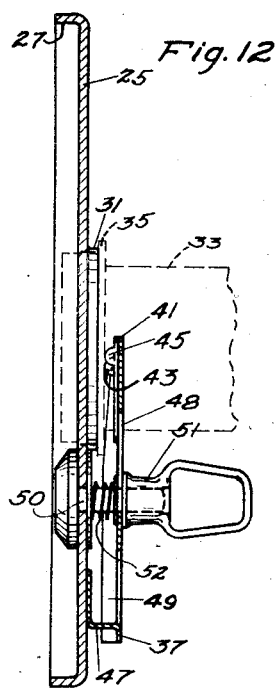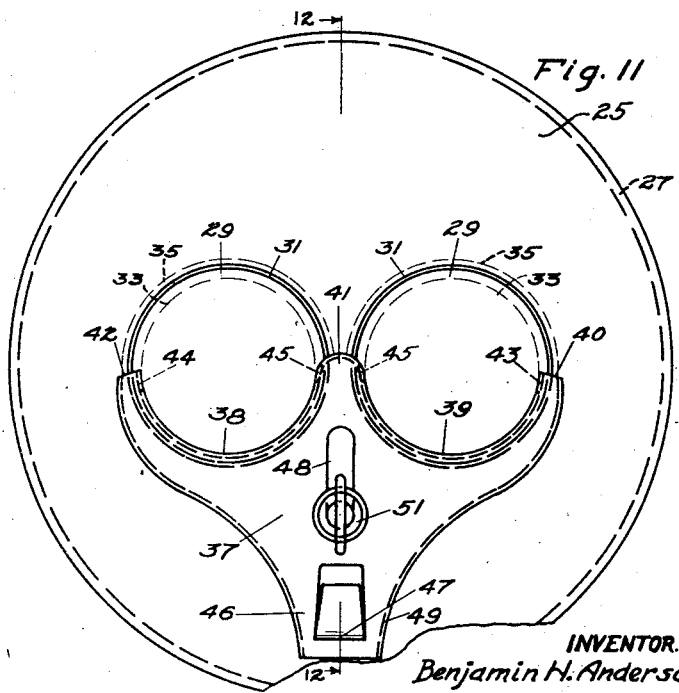

Patented June 23, 1942

2,287,506

UNITED STATES PATENT OFFICE 2,287,506

MILKING MACHINE

Benjamin H. Anderson, Madison, Wis., assignor to Ben. H. Anderson Manufacturing Co., Madison, Wis., a corporation of Wisconsin Application December 10, 1938, Serial No. 244,927

11 Claims. (Cl. 31—82)

This invention relates to milking machines, and more particularly to portable milking machines. It will be understood, however, that certain elements of the construction are equally adaptable to permanently installed mechanisms.

One of the objects of this invention is to provide a milking machine which is simple in construction and easy to operate.

A further object of this invention is to provide a milking machine in which the members through which the milk flows may be cleaned readily and thoroughly.

Another object of this invention is to provide a simple and effective valve member and valve or milk receiving chamber which may be removed easily for cleaning purposes.

A further object of this invention is to provide simple means for retaining the valve member and valve or milk receiving chamber in operable position and in the milk container cover which permits rapid and easy removal of the valve member and milk receiving or valve chamber from the cover.

A further object of this invention is to provide novel means for retaining the milk container cover in position on the milk container during operation of the milking machine.

Another object of this invention is to provide a novel pivotal or swivel mounting for the milk conduits or the milk conduit supporting members.

Further objects and advantages of this invention will become apparent from the detailed description and claims and the accompanying drawings, wherein:

Figure 3:
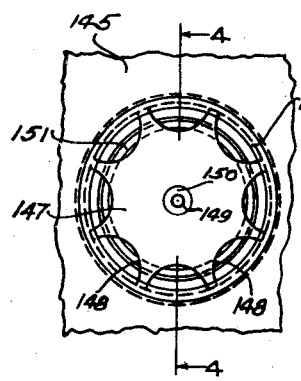
Figs. 3, 5 and 7 are bottom views of valve members and associated valve or milk receiving chambers mounted in the milk container covers.
Figure 4:
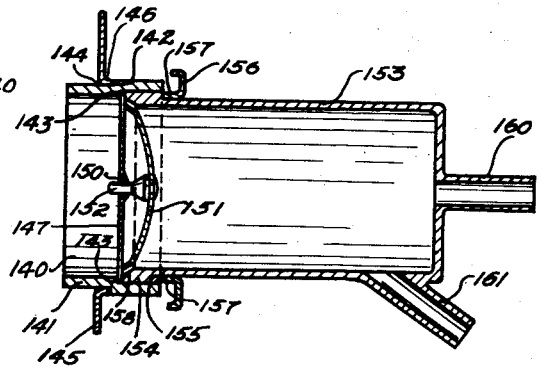
Figure 5:
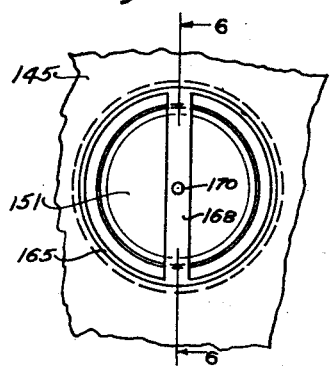
Figure 6:
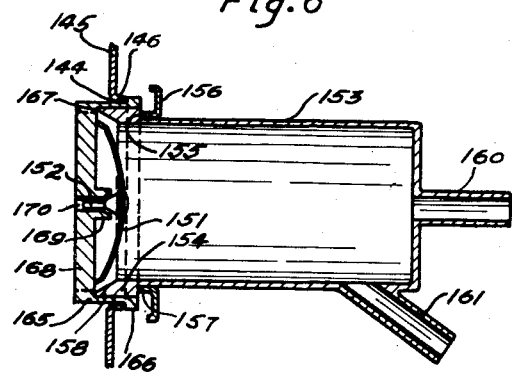
Figure 7:
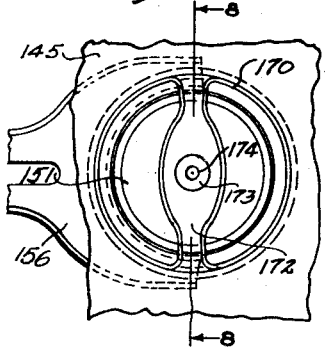
Figure 8:
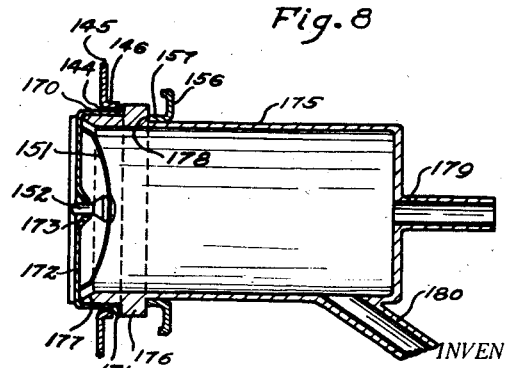

Figs. 4, 6 and 8 are sectional views of the members illustrated in Figs. 3, 5 and 7, taken on lines 4—4, 6—6 and 8—8 respectively.

Figure 2:
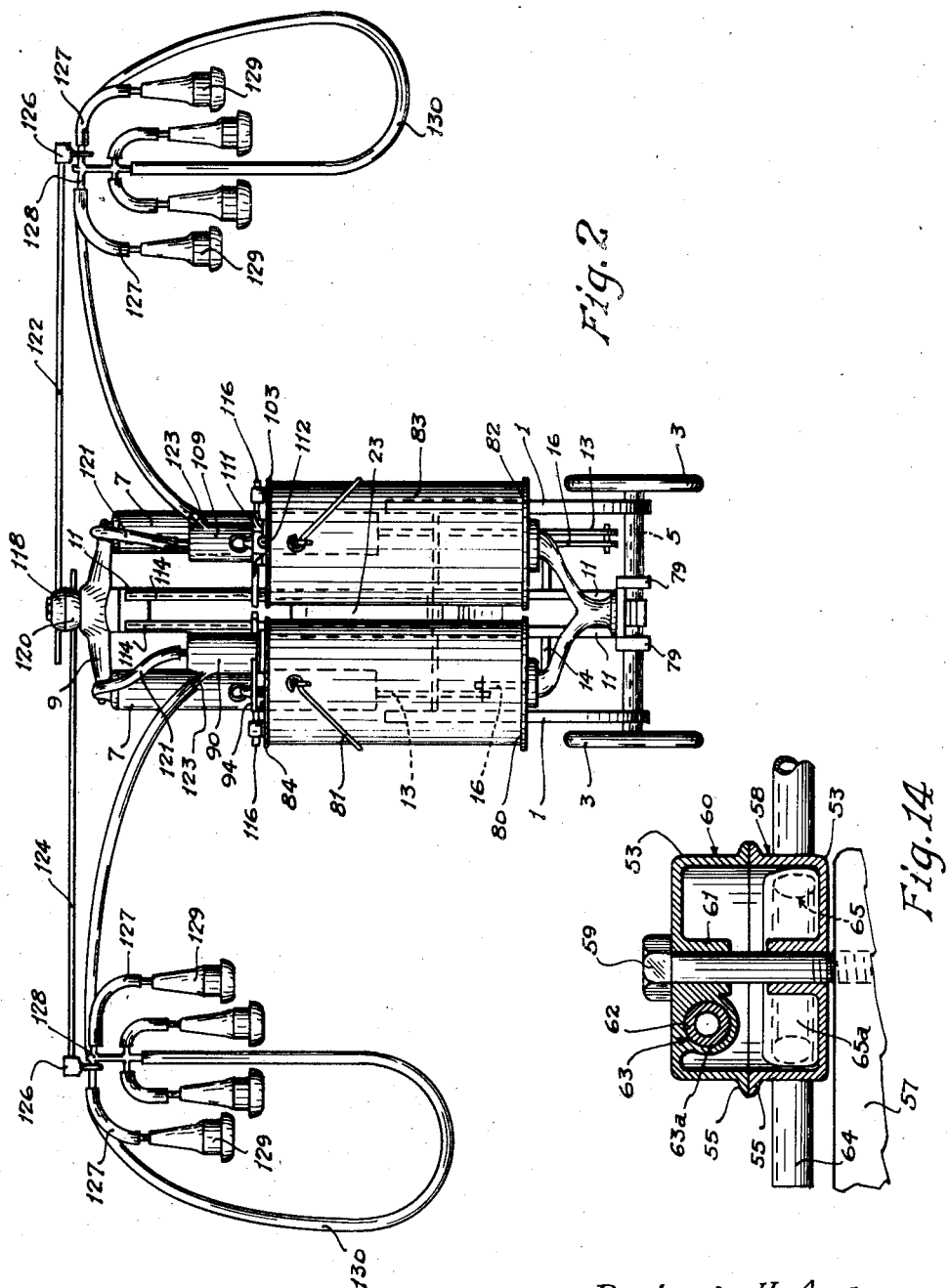
Fig. 2 is a front elevational view of a portable milking machine embodying my improvements.

Fig. 9 is a top plan view of a milk container cover adapted for use in the milking machine illustrated in Fig. 2.

Fig. 10 is a sectional view of the cover illustrated in Fig. 9, taken on line 10—10 of Fig. 9.

Figure 1:
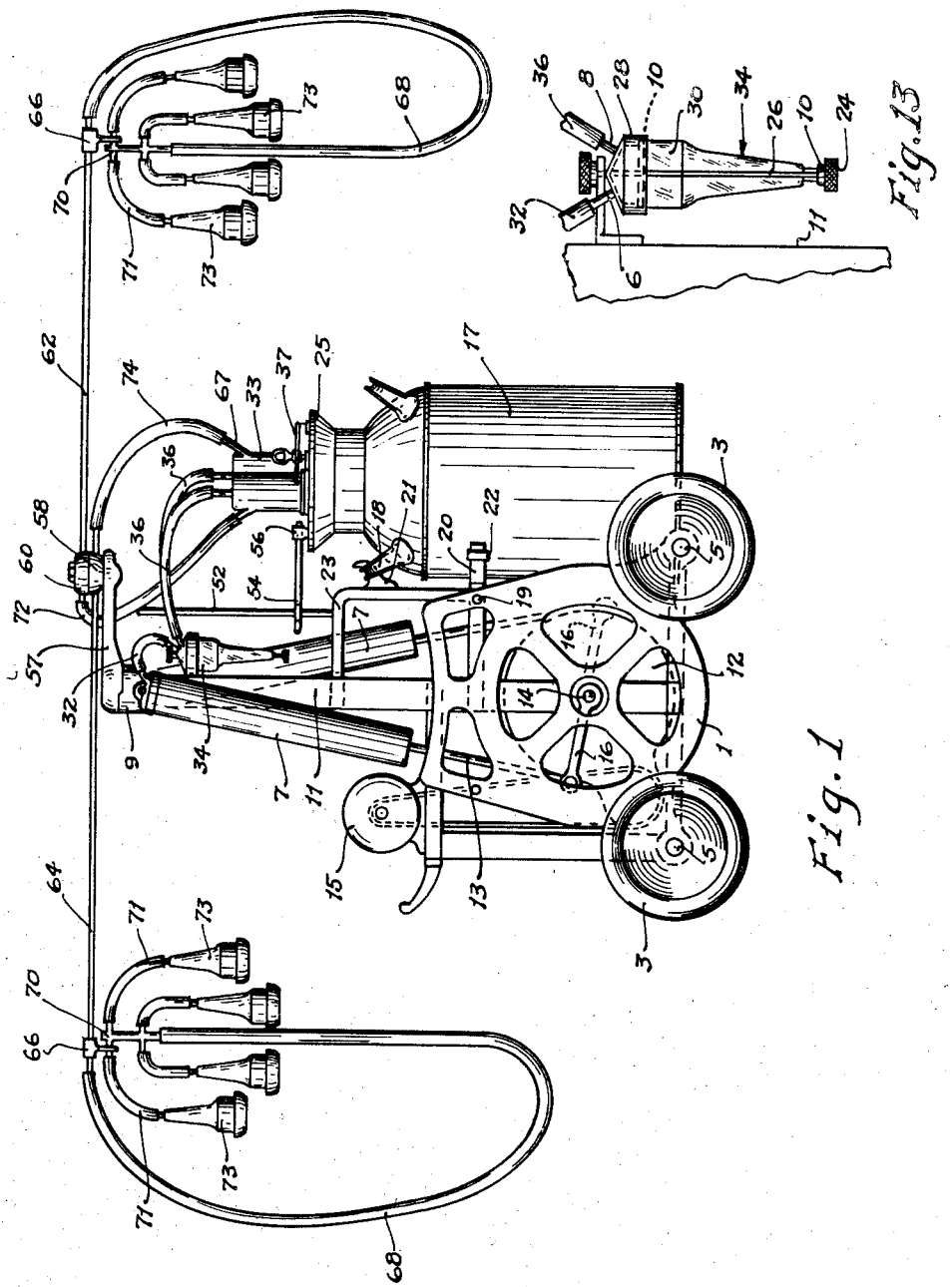
Fig. 1 is a side elevational view of a portable milking machine embodying my improvements.

Fig. 11 is a top plan view of a milk container cover adapted for use in the milking machine illustrated in Fig. 1.

Fig. 12 is a sectional view of the cover illustrated in Fig. 11, taken on line 12—12.

Fig. 13 is a side elevational view, at an enlarged scale, of a trap unit; and,

Fig. 14 is a cross sectional view of a swivel head.

Referring to the drawings, the milking machine comprises a frame 1 supported on wheels 3 by means of axles 5. Pump cylinders 7 are pivotally suspended from crosshead 9 which is rigidly secured to the upper ends of channel members 11. Piston rods 13 are driven by motor 15 through a reduction gear 12, shaft 14 and cranks 16.

The milk container 17, illustrated in Fig. 1, comprises a conventional type milk can or shipping can. Container 17 is supported on the milking machine by handle 18 which engages a hook 21 which is integral with or rigidly secured to a hook frame 23. Hook frame 23 is in turn rigidly secured to channel members 11 and to frame 1 by means of bolts 19. A bumper 20 is rigidly secured to the lower end of hook frame 23 and preferably is bent into an arc to conform to the contour of the container 17. If desired, resilient or elastic members 22 may be provided adjacent the extremities of the bumper.

A cover 25 is provided having a depending skirt or rim 27 which fits loosely over the open end of container 17. Cover 25 is provided with a pair of openings 29, see Fig. 11. The container is flared upwardly at the openings 29 to provide upwardly extending rims 31. Valve chambers 33 and the valve retaining rings 35 are disposed in openings 29, being supported on rims 31. Yoke 37 is provided to securely retain the valve chambers and valve retaining rings in openings 29 and to retain the chambers and retaining rings in assembled or operable position.

Valve chambers 33 communicate with pump cylinders 7 through flexible tubes 36, trap 34 and flexible tubes 32, only one trap and tube 32 being illustrated in Fig. 1. Although it is unnecessary to employ a trap between the valve chamber and pump, such a trap provides a simple and efficient means by which the dairyman may quickly detect a failure in the apparatus with a consequent flow of milk into the pump. The trap comprises a transparent teat cup 30, see Fig. 13, supported by means of a head 28 which is rigidly or removably secured to channels 11. The head 28 is provided with a depending rod 26 which extends through the teat cup. The lower end of rod 26 is threaded and receives nut 24. Rubber or other washer members 10 are disposed between the top edge of the teat cup and the head and the lower edge of the teat cup and nut 24 to permit air tight connections to be maintained when the nut 24 is tightened. The head is provided with two conduits 8 and 6 adapted to receive the tubes 36 and 32, respectively. Rod 26 may be independent of head 28, passing through the head and being threaded to a cooperating nut at the top of the head.

I prefer to employ transparent teat cups as trap elements so that in the event one of the teat cups used in milking becomes broken, the trap may be disconnected and the cup removed from the trap and used in milking. This eliminates the necessity of the farmer maintaining spare cups for emergencies. The milking machine may be operated with equal effectiveness by connecting tubes 36 directly to the pumps 7.

The yoke 37 is trifurcated to provide two concavely curved arcuate portions 38 and 39 and three projecting portions 40, 41 and 42. Arcuate portions 38 and 39 conform roughly to the contour of the valve chambers 33 and the projecting portions partially encompass the valve chambers. The edge or marginal portions of yoke 37 are preferably turned downwardly, as at 49, to strengthen and rigidify the yoke. The inner ends of members 40 and 42 are provided with depending protuberances or lugs 43 and 44, respectively, while member 41 is provided with protuberances or lugs 45 on both sides adjacent the extremity of member 41. The lugs are adapted to bear upon shoulders on the valve chambers, whereby the chambers and valve retaining rings 35 are maintained in assembled relation within openings 29. The base of the yoke is provided with a bearing or spacing member 47 which may be formed integral with base 46, as by a stamping operation. An elongated slot 48 is provided between arcuate portions 38 and 39.

Bolt 50 is rigidly secured to cover 25. Coil spring 53 is preferably threaded on bolt 50 and constantly urges yoke 37 upwardly. Yoke 37 is placed on cover 25, elongated slot 48 receiving bolt 50. Ring nut 51 is threaded on the end of bolt 50 and provides means for securely clamping the yoke on the shoulder of the valve chambers, bearing member 47 maintaining the base of the yoke in substantially fixed relation from the cover. Upon loosening the ring nut, slot 48 permits the yoke to be drawn forward sufficiently to allow the valve chambers and valve retaining rings to be lifted from openings 29.

A rod 52 is rigidly secured to hook frame 23 and extends upward substantially vertical. A cover holding arm 54 is slidably mounted on rod 52. The bore of the aperture in the arm 54 is of such diameter as to permit the arm to be easily raised or lowered when held at substantially right angles to the axis of the rod, but is sufficiently small in diameter to prevent the free movement of the arm. Since the center of gravity of the arm is at some distance from rod 52, the downward pull of gravity is adequate to create sufficient frictional force between the rod and the edges and surfaces of the aperture to hold the rod in any position to which the arm may be raised or lowered.

The free end of arm 54 is preferably provided with a rubber snubber 56. The arm may be held in a right angle position with respect to rod 52 and may be lowered and pressed into contact with cover 25. The snubber 56 exerts adequate pressure upwardly to create sufficient friction between the rod and arm to maintain the arm in the desired position. If it is desired to remove cover 25, the arm may again be placed in a right angle position with respect to rod 52 by exerting a downward pressure on arm 54 to compress the snubber, after which the arm may be raised.

I have found that it is not necessary to move arm 54 downwardly into contact with cover 25 when the machine is in operation since the vibration of the apparatus will be sufficient to cause the arm to be moved downwardly by gravity. It is also not necessary to force the arm into contact with cover 25 so as to compress the snubber. This means is simple yet very effective to prevent accidental displacement of the cover during operation and use of the milking machine.

Arm 57 is rigidly secured to crosshead 9 and extends forwardly. A swivel head is mounted on the forward end of arm 57. The swivel head comprises a pair of disc holders 58 and 60 which are rotatably mounted on the arm. The disc holders are identical in construction, see Fig. 14, each comprising a cup-like body 53 having its wall flared outwardly slightly at the open end to provide bearing surfaces 55. A centrally positioned journal 61 is provided to receive bolt 59 which is threaded into arm 57. Bearings 63a and 65a are positioned to one side of journal 61, and are provided with openings 63 and 65, respectively. The disc holders are assembled with their open ends toward each other and with the surfaces 55 in contact. Milk conduits or tubes 62 and 64 are slidably mounted in openings 63 and 65, respectively.

The weight of the tubes creates sufficient friction between bearing surfaces 55 of the disc holders to maintain the tubes in any desired position into which they may be swung.

The milk spigots or conduits 67 of the valve chambers 33 communicate with milk conduits or tubes 62 and 64 by means of flexible tubes 72 and 74, respectively. Hooks 66 are mounted on tubes 62 and 64 adjacent the free ends of the tubes. A flexible tube 68 connects the free ends of the milk conduits with the milk claws 70 which in turn communicate with a plurality of teat cups 73 by means of short lengths of flexible tubing 71.

It is apparent that in the above described construction the milk from two cows is delivered into a single receiving container. If it is desired to deliver the milk from each cow into a separate container, for example, when it is desired to weigh and test the milk from each cow, I prefer to employ the apparatus illustrated in Figs. 2, 9 and 10.

The milking machine illustrated in Fig. 2 comprises the same type of frame, pumps and motors as those in the milking machine illustrated in Fig. 1. Platforms 80 and 82 are mounted on longitudinal bars 79 which are supported by axles 5. Bars 79 also serve as a support for reduction gear set 12. Each platform serves as a support for an individual milk receiving container or cream can 81 and 83, respectively. Each can is fitted with a cover 84 having an opening 86. The opening 86 is defined by an upwardly projecting rim 88. Valve chamber 90 and valve retaining ring 92 are mounted within opening 86, being supported on rim 88.

Yoke 94 is mounted on bolt 96 which is rigidly secured to cover 84. Yoke 94 is bifurcated to provide a concavely curved arcuate portion 98 which roughly conforms to the contour of the valve chamber. The marginal portions of the yoke are preferably turned downwardly as at 100, to strengthen and rigidify the yoke. The inner extremities of the depending marginal portion are enlarged to provide lugs 102 which engage the shoulders on the valve chamber. The base portion 104 of the yoke 94 is provided with a spacing member 106. The base portion is also provided with an elongated slot 107 adapted to receive bolt 96. A coil spring 105 may encompass bolt 96 to constantly urge yoke 94 upwardly. Ring nut 108 is threaded on the end of bolt 96 and provides means for securely clamping the yoke over the shoulders of the valve chambers and thereby maintain the valve chamber and valve retaining ring in assembled or operative position within opening 86. Upon loosening ring nut 108, slot 107 permits yoke 94 to be drawn forward sufficiently to allow the valve chamber and valve retaining ring to be lifted and removed from the cover.

The construction of the cover 103 and the associated valve chamber 109, valve retaining ring and yoke 111 are similar to that of the cover 84 and its associated elements. However, cover 103 is provided with a spacing member 112. Yoke 111, therefore, is not provided with a spacing member.

A pair of spaced rods 114 extend upward substantially vertically from hook frame 23. Cover holding arms 116 are slidably mounted on rods 114. The construction, function and operation of the cover holding arms 116 are similar to those of the cover holding arm 54 described in connection with Fig. 1.

A pair of disc holders 118 and 120 are rotatably mounted on crosshead 9 to form a swivel head. The construction and operation of the swivel head is similar to that described hereinbefore. Rods 122 and 124 are slidably mounted in disc holders 118 and 120, respectively. Rods 122 and 124 may be moved into any desired position. The friction created between the bearing surfaces of holders 118 and 120 is sufficient to maintain the rods in any desired position. Hooks 126 are secured to the free ends of rods 122 and 124.

The valve chambers communicate directly with pumps 7 by means of flexible tubing 121. The milk spigots or conduits 123 of the valve chambers communicate with the milk claws 128 by means of flexible tubing 130. The tubing 130 is supported by means of the hooks 126 which also serve to support the milk claws when not in use. The milk claws in turn communicate with a plurality of teat cups 129 by means of short lengths of flexible tubing 127.

In Figs. 3 to 8, inclusive, I have illustrated in detail the construction of valve chambers, valves and valve retaining rings.

The valve retaining ring illustrated in Figs. 3 and 4 comprises a tubular sleeve 140 having a reduced portion 141 forming an exterior shoulder 142 and an internal ledge 143. The reduced portion 141 is adapted to be positioned within opening 144 in can cover 145, shoulder 142 being disposed on rim 146. A spider 147 is provided with cut-out portions 148 and with a centrally positioned aperture 149. The spider is preferably formed by a stamping operation and its center portion is raised, as at 150. A valve plate 151 having a depending guide pin 152 is disposed on spider 147, the aperture 149 receiving guide pin 152. The guide pin and aperture maintain valve plate 151 in centered position at all times. In forming the aperture 149 and the raised portion 150, I prefer to draw the metal to provide a bearing surface for pin 152 which is longer than the normal thickness of the spider.

Valve chamber 153 is cylindrical and is provided with an enlarged base 154 which forms a shoulder 155. The enlarged base fits loosely within sleeve 140, being disposed on spider 147. The valve retaining ring and the valve chamber are maintained in assembled or operable relation and the valve retaining ring is maintained in aperture 144 by means of a yoke 156. The yoke is similar in construction to that described hereinbefore, the lugs 157 bearing upon the shoulder 155 of the valve chamber. In the assembled position of the valve retaining ring and valve chamber, spider 147 is held securely between ledge 143 and the lower end of the valve chamber. The lower end of the inner wall of valve chamber is ground to form a valve seat 158.

Air spigot 160 communicates with the interior of the valve chamber and with the vacuum source, such as the pumps 7, illustrated in Figs. 1 and 2. Milk spigot 161 communicates with the interior of the valve chamber and with the teat cups through suitable tubing.

In operation, on the application of vacuum to spigot 160 or on the suction stroke of the pump, the clearance between valve plate 151 and valve seat 158 is sufficiently small to permit the valve to be closed by the atmospheric pressure. On closing of the valve, milk is drawn through the teat cups, associated tubing, milk spigot 161 and flows into valve chamber 153. On the return stroke of the pump or the breaking of the vacuum, valve plate 151 falls to the spider 147 and the milk flows from the valve chamber through cut-outs 148 into the milk receiving container.

The valve retaining ring and valve chamber may be readily removed from the can cover by loosening the ring nut, see Figs. 9 to 12, which maintains the yoke 156 in contact with shoulder 155. Yoke 156 is then withdrawn, as described hereinbefore. The chamber may then be lifted from the retaining ring and the retaining ring may be lifted from opening 144. The valve plate and spider may be removed from the valve retaining ring. The complete and simple disassembling of the elements permits each element to be properly and thoroughly cleaned.

The valve retaining ring illustrated in Figs. 5 and 6 comprises a sleeve 165 having an outwardly projecting flange 166. The sleeve is adapted to be positioned in opening 144 in cover 145, the outwardly projecting flange 166 being disposed on the upwardly extending rim 146 of cover 145. Sleeve 165 is provided with an internal ledge 167 and a cross bar 168. The cross bar is formed with a raised central section 169 having an aperture 170 located centrally with respect to the sleeve. Valve plate 151 is positioned on the cross bar, aperture 170 receiving guide pin 152 to insure centering of the valve plate at all times. The enlarged base 154 of valve chamber 153 fits loosely within sleeve 165 and is positioned on ledge 167. The valve retaining ring and valve chamber 153 are maintained in assembled relation and the valve retaining ring is maintained in aperture 144 by means of yoke 156, lugs 157 bearing upon shoulder 155 of the valve chamber.

The air spigot 160 communicates with the interior of chamber 153 and with the vacuum pumps. Milk spigot 161 communicates with the interior of the valve chamber and with the teat cups. The operation of the valve, removal and disassembling of the elements is similar to that described in connection with the construction illustrated in Figs. 3 and 4.

The valve retaining ring illustrated in Figs. 7 and 8 may be formed by a stamping operation. Sleeve 170 is drawn with an outwardly flared rim 171. The sleeve is adapted to be positioned within opening 144 in cover 145, the flange 171 being disposed on upwardly projecting rim 146. The sleeve is formed with an integral cross member 172. The center portion of the cross member is preferably raised, as at 173. The center portion of the cross member is provided with an aperture 174 which is centered with respect to the sleeve. Valve plate 151 is positioned on cross member 172, the aperture 174 receiving guide pin 152 whereby the valve plate is centered. In forming the aperture 174 and the raised portion 173, the metal is drawn to provide a bearing surface for pin 152 which is longer than the normal thickness of the cross member.

Valve chamber 175 is provided with an outwardly projecting flange 176 adjacent its base. The base portion of the valve chamber is adapted to be positioned within sleeve 170, the lower surface of flange 176 contacting flange 171 of the sleeve. The lower end of the inner wall of the valve chamber is ground to form a valve seat 177. The valve retaining ring and the valve chamber are maintained in assembled relation and the valve retaining ring is maintained in opening 144 by means of yoke 156. The lugs 157 of the yoke bear upon the upper surface of the flange 176 which forms a shoulder 178.

The air spigot 179 communicates with the interior of the valve chamber 175 and with the vacuum pumps. Milk spigot 180 communicates with the interior of the chamber and with the teat cups. The operation of the valve, removal and disassembling of the elements are similar to that described in connection with the construction illustrated in Figs. 3 and 4.

Although I have illustrated a particular form of milking machine, it is apparent that various elements may be embodied in other forms of machines and apparatus without departing from the spirit of my invention.

It is to be understood that the foregoing description is merely illustrative of my invention and that various modifications may be made without departing from the scope of my invention. For example, I have illustrated the valve plate 151 as being dome-shape and drawn or formed from sheet material and the guide pin 152 as being secured to the valve plate by riveting. It is apparent that the guide pin may be secured to the valve plate by screw means with equivalent effectiveness, or that the valve plate may be cast and the guide pin cast integral with the plate. Other modifications will present themselves to those skilled in the art.

I claim:

1. In a device of the class described, in combination, a valve retaining ring, a valve plate positioned in said retaining ring, means associated with said retaining ring adapted to support said valve plate in open position, and a valve chamber mounted loosely on said retaining ring, the base portion of said valve chamber fitting loosely within said retaining ring.

2. In a device of the class described, in combination, a valve retaining ring, a dome-shaped valve plate positioned in said retaining ring, means associated with said retaining ring to support said valve plate, and a valve chamber, the inner wall of which forms a valve seat, mounted loosely on said retaining ring, the base portion of said valve chamber fitting loosely within said retaining ring.

3. In a device of the class described, in combination, a valve retaining ring having an internal ledge, a spider disposed on said ledge, said spider having a centrally positioned aperture therein, a valve plate disposed on said spider, a depending centrally positioned guide pin on said valve plate, said guide pin registering with said aperture, and a valve chamber mounted loosely on said retaining ring, the base portion of said valve chamber fitting loosely within said retaining ring.

4. In a device of the class described, in combination, a valve retaining ring having an internal ledge, a plate disposed on said ledge, said plate having a centrally positioned aperture therein and having marginal cut-out portions, a dome-shaped valve plate disposed on said plate, a depending centrally positioned guide pin on said valve plate, said guide pin projecting through said aperture, and a valve chamber having an internal valve seat mounted loosely on said retaining ring, the base portion of said valve chamber fitting loosely within said retaining ring.

5. In a device of the class described, in combination, a valve retaining ring, a cross bar in said retaining ring, said cross bar having a centrally positioned aperture therein, a valve plate disposed on said cross bar, a depending guide pin on said valve plate, said guide pin registering with said aperture, and a valve chamber mounted loosely on said retaining ring, the base portion of said valve chamber fitting loosely within said ring.

6. In a device of the class described, in combination, a valve retaining ring having an internal ledge, a cross bar in said retaining ring, said cross bar having a centrally positioned aperture therein, a dome-shaped valve plate disposed on said cross bar, a depending guide pin on said valve plate, said guide pin registering with said aperture, and a valve chamber disposed on said ledge, the base portion of said valve chamber fitting loosely within said retaining ring.

7. In a device of the class described, in combination, a valve retaining ring having an integral cross bar therein, said cross bar having a raised portion and a centrally positioned aperture therein, a dome-shaped valve plate disposed on said cross bar, a depending guide pin on said valve plate, said guide pin registering with said aperture, and a valve chamber having an internal valve seat therein mounted loosely on said retaining ring, the base portion of said valve chamber fitting loosely within said retaining ring.

8. In a milking machine, a milk receiving container, a cover for said container, said cover having at least one opening therein, a valve retaining ring mounted loosely in said opening, a valve plate mounted in said retaining ring, a valve chamber having an internal valve seat therein mounted loosely on said retaining ring, the base portion of said valve chamber fitting loosely within said retaining ring, and a yoke removably mounted on said cover and adapted to maintain said valve chamber on said retaining ring and to maintain said valve retaining ring in said opening.

9. In a milking machine, a milk receiving container, a cover for said container, said cover having at least one opening therein, a valve retaining ring, having an external flange, supported loosely in said opening by said flange, a valve plate in said retaining ring, a valve chamber having an internal valve seat therein mounted loosely on said retaining ring, the base portion of said valve chamber fitting loosely within said retaining ring, said valve chamber having an external shoulder adjacent the base portion of said valve chamber, a yoke removably mounted on said cover, the projecting portions of said yoke bearing upon said shoulder on said valve chamber and adapted to maintain said valve chamber on said retaining ring and to maintain said retaining ring in said opening.

10. In a milking machine, a milk receiving container, a cover for said container, said cover having at least one opening therein, a valve retaining ring, having an outwardly projecting flange, supported loosely in said opening by said flange, a cross bar having a centrally positioned aperture therein in said retaining ring, a dome-shaped valve plate disposed on said cross bar, a depending guide pin on said valve plate registering with said aperture, a valve chamber having an internal valve seat therein mounted loosely on said retaining ring, the base portion of said valve chamber fitting loosely in said retaining ring, an external shoulder on said valve chamber adjacent the base portion thereof, and a yoke removably mounted on said cover, said yoke having an arcuate portion adapted to partially encompass said valve chamber, the projecting portions of said yoke bearing upon said shoulder on said valve chamber and adapted to maintain said valve chamber on said retaining ring and to maintain said retaining ring in said opening.

11. In a milking machine, a milk receiving container, a cover for said container, said cover having two openings therein, a valve retaining ring mounted loosely in each of said openings, a valve plate in each of said retaining rings, a valve chamber mounted loosely on each of said retaining rings, the base portion of said valve chambers fitting loosely within said retaining rings, an external shoulder on said valve chambers adjacent the base portion thereof, a trifurcated yoke removably mounted on said cover, said yoke having two arcuate portions adapted to partially encompass said valve chambers, the projecting portions of said yoke bearing upon said shoulders on said valve chambers and adapted to maintain said valve chambers on said retaining rings and to maintain said retaining rings in said openings.

BENJAMIN H. ANDERSON.